(12) United States Patent
Roullier

(10) Patent No.: US 8,914,035 B2
(45) Date of Patent: Dec. 16, 2014

(54) MULTI SIM MODEM MANAGEMENT

(75) Inventor: Sylviane Roullier, Le Mans (FR)

(73) Assignee: ST-Ericsson SA, Plan-les-Ouates (CH)

( * ) Notice: Subject to any disclaimer, the term of this patent is extended or adjusted under 35 U.S.C. 154(b) by 15 days.

(21) Appl. No.: 13/990,525

(22) PCT Filed: Nov. 23, 2011

(86) PCT No.: PCT/EP2011/070795
§ 371 (c)(1),
(2), (4) Date: Jun. 21, 2013

(87) PCT Pub. No.: WO2012/072463
PCT Pub. Date: Jun. 7, 2012

(65) Prior Publication Data
US 2013/0260778 A1    Oct. 3, 2013

Related U.S. Application Data

(60) Provisional application No. 61/435,598, filed on Jan. 24, 2011.

(30) Foreign Application Priority Data

Dec. 1, 2010 (EP) .................................... 10306337

(51) Int. Cl.
*H04W 72/00* (2009.01)
*H04W 76/02* (2009.01)
*H04W 88/06* (2009.01)
*H04W 68/00* (2009.01)
*H04W 60/00* (2009.01)
*H04W 72/04* (2009.01)
*H04W 8/18* (2009.01)

(52) U.S. Cl.
CPC .............. *H04W 88/06* (2013.01); *H04W 68/00* (2013.01); *H04W 60/005* (2013.01); *H04W 72/042* (2013.01); *H04W 8/183* (2013.01); *H04W 76/02* (2013.01)
USPC ...................... 455/452.1; 455/450; 455/414.1; 455/458; 455/558

(58) Field of Classification Search
CPC .... H04W 24/00; H04W 72/082; H04W 16/10
USPC .................. 455/452.1, 450, 414.1, 458, 558
See application file for complete search history.

(56) References Cited

U.S. PATENT DOCUMENTS

2003/0181216 A1    9/2003 Tsai et al.
2006/0177029 A1*   8/2006 Dotan et al. ............. 379/114.01
(Continued)

OTHER PUBLICATIONS

International Search Report issued in corresponding International application No. PCT/EP2011/070795, date of mailing Dec. 14, 2011.

*Primary Examiner* — Nghi H Ly
(74) *Attorney, Agent, or Firm* — Patent Portfolio Builders PLLC

(57) ABSTRACT

Multiple subscriber identity modem (10) capable of receiving messages related to at least two subscriber identities, characterized in that it comprises a delaying module (19) configured to: —determine, from a connection request for a service associated with a first subscriber identity, whether the service belongs to a first class of communication, and, when the service has been determined as belonging to the first class of communication, —determine whether a remaining time between the connection request and a next paging occasion, associated with a second subscriber identity, is falling on a first side of a threshold, and, when the remaining time has been determined as falling on the first side of the threshold, —delay an access grant indication related to the connection request until the paging occasion has been handled.

14 Claims, 3 Drawing Sheets

(56) References Cited

U.S. PATENT DOCUMENTS

2008/0064443 A1* 3/2008 Shin et al. .................... 455/558
2009/0131054 A1  5/2009 Zhang
2009/0156256 A1  6/2009 Shi
2009/0156257 A1  6/2009 Shi
2009/0312020 A1 12/2009 Lee

* cited by examiner

MULTI SIM MODEM MANAGEMENT

TECHNICAL FIELD

The present invention generally relates to devices and methods for the management of a multiple subscriber identity modem in a cellular telecommunication network. It concerns more particularly the management of multiple subscriber identity modules for devices capable of receiving messages relating to two or more subscriber identities (e.g. from several cellular networks and/or using different radio access technologies (RAT)), but not simultaneously.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

Mobile devices comprising Multi SIM (Subscriber Identity Module) are now becoming common on some market places. A benefit of such mobile devices for the user is that the user should be able to receive calls on several subscriptions.

For example, Dual SIM Dual Standby (DSDS) modem comprises means for receiving/sending messages from/to at least two subscriber identities. The at least two subscriber identities may be associated with the same or different cellular networks and/or may be using the same or different radio access technologies (RAT).

However, typical DSDS mobile devices have only one radio module and/or only one baseband module and consequently are obliged to slice their radio opening time between the SIMs, i.e. to monitor a first SIM related cells at some given times and a second SIM related cells at other given times. So, as soon as a subscription is active (for signalling with the network, voice call or packet transfer, for example), the other subscription becomes out of range with respect to the network, typically leading to missed calls on the other subscription identity.

As Smartphones and open OS (Operating System) are being deployed on the market, more and more packet background services can be activated by the user. But as these services are running in the background (often without being initiated by the user), the user typically is not aware of that they are active. Thus, the user may be disappointed when (for example) receiving an SMS (Short Message Service) indicating a missed call on the other SIM when this activity is finished.

US 2009/0156257 describes a method for dealing with carrier conflict between SIM cards in a DSDS mobile phone by setting priority levels for services, and delaying access requests. The priority levels that are described in this document are related to physical layer conflicts. Thus, even when applying this method, the user will experience missed calls due to packet background services.

Embodiments of the present invention will improve the situation.

SUMMARY

To address these needs, a first aspect of the present invention relates to a multiple subscriber identity modem capable of receiving messages related to at least two subscriber identities, characterized in that it comprises a delaying module configured to:

determine, from a connection request for a service associated with a first subscriber identity, whether the service belongs to a first class of communication, and, when the service has been determined as belonging to the first class of communication, determine whether a remaining time between the connection request and a next paging occasion, associated with a second subscriber identity, is falling on a first side of a threshold, and, when the remaining time has been determined as falling on the first side of the threshold, delay an access grant indication related to the connection request until the paging occasion has been handled.

In several common situations, mobile terminals will perform background tasks which involve autonomous connections to the network. Examples of such connections are:

Email—Checking periodically if there is new email available,

RSS feeds—Checking for news flash information,

Current weather and financial data—Frequent updates of changing data,

Software and security updates—Most modern operating systems/software platforms have an auto update function.

Such background tasks may be delayed without much (or even any) impact on performance of the modem. Thus, in some embodiments they may be considered to belong to a non-urgent class of communication.

One purpose of this modem is to grant service which is determined as belonging to a non-urgent class of communication depending on a paging occasion, and thus to avoid missed call without reducing the QoS.

In some embodiments of the invention, the delaying module is further configured to, when the remaining time has been determined as falling on a second side of the threshold, transmit an access grant indication related to the connection request.

In some embodiments of the invention, the delaying module comprises a request module configured to request a connection for a service, and a control block configured to control a radio opening time for each subscriber identity of the multiple subscriber identity modem, the control block being further configured to receive the connection request for the service and to determine whether the service belongs to the first class of communication.

The delaying module may further comprise a scheduling block configured to determine information regarding a scheduling of paging occasions for each subscriber identity of the multiple subscriber identity modem, the scheduling block being further configured to determine whether the remaining time between the connection request and the next paging occasion is falling on the first side of the threshold.

The scheduling block may further be configured to transmit to the control block an access grant indication to trigger a radio opening time for the first subscriber identity.

The scheduling block may further be configured to, when the remaining time between the connection request and the next paging occasion has been determined as falling on the first side of the threshold, wait for the reception of an indication indicating that the paging occasion has been handled before transmitting the access grant indication.

In some embodiments of the invention, the modem is a Dual SIM Dual Standby (DSDS) modem.

A second aspect of the present invention relates to a mobile device comprising a multiple subscriber identity modem according to the first aspect, and a reception/transmission block for receiving and/or transmitting signals, the reception/transmission block being coupled to the multiple subscriber identity modem.

A third aspect of the present invention relates to a method of data processing in a multiple subscriber identity modem capable of receiving messages related to at least two subscriber identities. The method comprises the steps of:

determining, from a connection request for a service associated with a first subscriber identity of the multiple subscriber identity modem, whether the service belongs to a first class of communication, and, when the service has been determined as belonging to the first class of communication, determining whether a remaining time between the connection request and a next paging occasion, associated with a second subscriber identity, is falling on a first side of a threshold, and, when the remaining time has been determined as falling on the first side of the threshold, delaying an access grant indication related to the connection request until the paging occasion has been handled.

For example, the method of data processing may be a method of transmission handling.

The method may comprise a step of controlling a radio opening time for a subscriber identity of the multiple subscriber identity modem.

The method may comprise a step of determining information regarding a scheduling of paging occasions for each subscriber identity of the multiple subscriber identity modem.

The method may further comprise a step of transmitting an access grant indication to trigger a radio opening time for the first subscriber identity.

In some embodiments of the invention, the method comprises a step of, when the remaining time between the connection request and the next paging occasion has been determined as falling on the first side of the threshold, waiting for the reception of an indication indicating that the paging occasion has been handled before transmitting the access grant indication.

A fourth aspect of the present invention relates to a computer program product comprising a computer readable medium, having thereon one or more stored sequences of instructions being loadable into a processor and adapted to cause, when executed by the processor, execution of the steps of the method according to the third aspect.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF EMBODIMENTS

Embodiments of the invention deal with the problem of simultaneously handling two or more subscriber identities within one single mobile device with one single reception/transmission chain being able to operate at a time. In particular, embodiments of the invention deal with the problem of avoiding missed calls by delaying a connection request for a non-urgent service, like packet background activity, in case it is near to a paging occasion on another subscriber identity, until the possible paging in this paging occasion has been handled.

Figure 1:
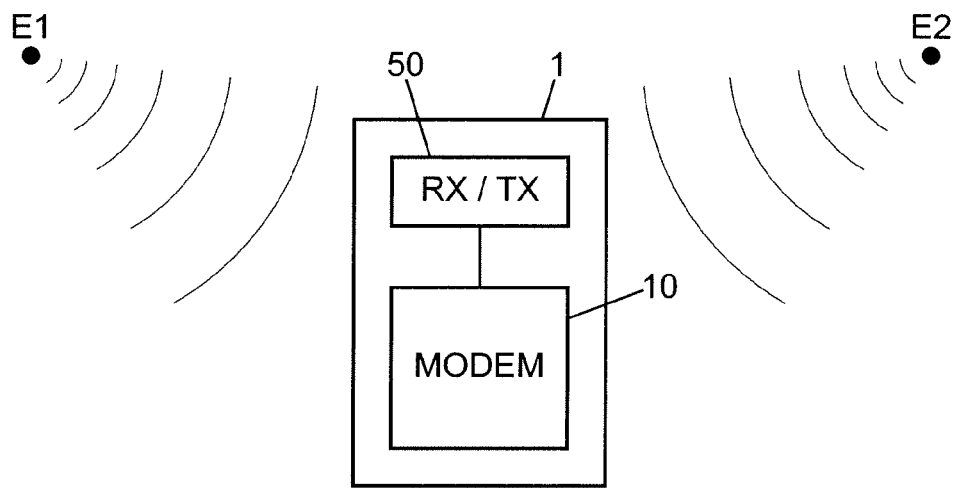
FIG. 1 is a schematic block diagram of a mobile device according to an embodiment of the invention.

FIG. 1 shows a mobile device 1, for example a mobile phone, according to an embodiment of the invention. Mobile device 1 comprises a multi SIM modem 10, for example a Dual SIM Dual Standby (DSDS) modem, and a reception/transmission block 50, for example an antenna system, in order to receive or transmit signals.

Figure 2:
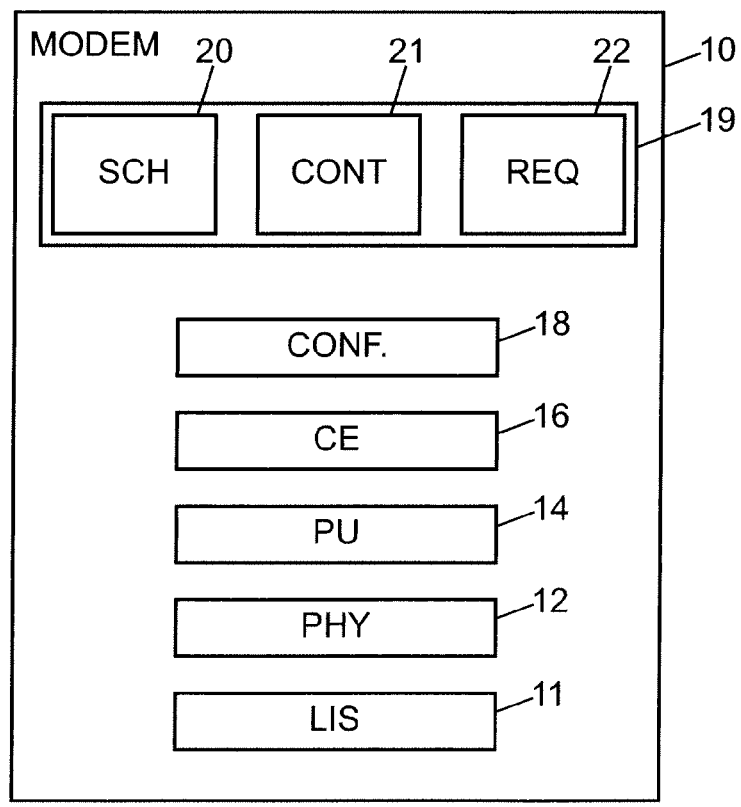
FIG. 2 is a schematic block diagram of a multi SIM modem according to some embodiments of the invention, that may be comprised in the mobile device.

In the example embodiment represented in FIG. 2, the modem 10 comprises a listening block 11 for listening to messages, for example paging messages, associated with a plurality of subscriber identities (coming from the same or different cellular networks and/or using the same or different radio access technologies (RAT)). In this example, modem 10 further comprises a physical interface block 12 configured to couple the modem 10 and the reception/transmission block 50, a processing block 14 configured to control other blocks of the modem 10, a cellular environment management block 16 configured to select a cell in the environment of the mobile device 1, and a modem configuration block 18 for configuring the modem 10.

Figure 4:
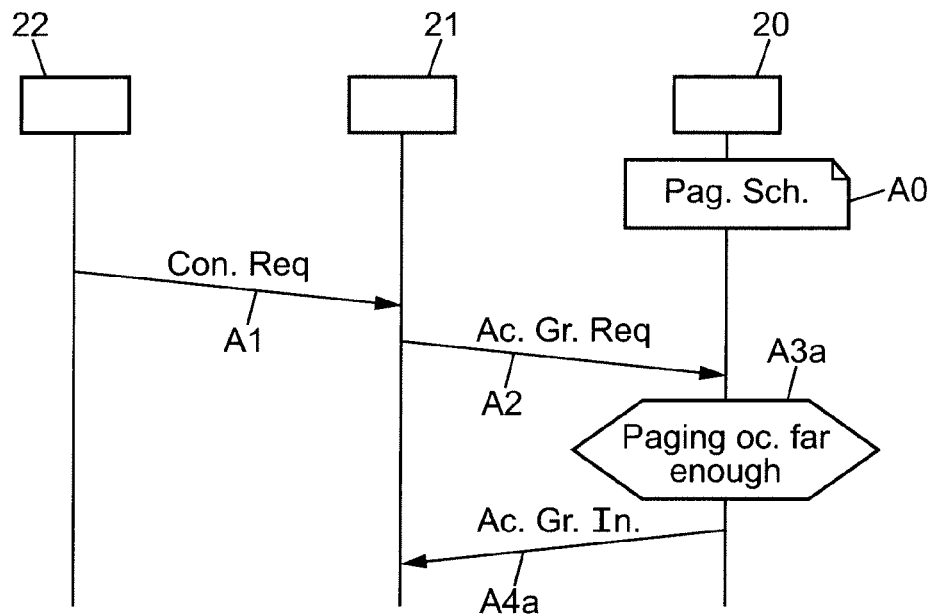
FIG. 4 and FIG. 5 are charts which show examples of transmission of an access grant indication depending on a paging occasion.
Figure 5:
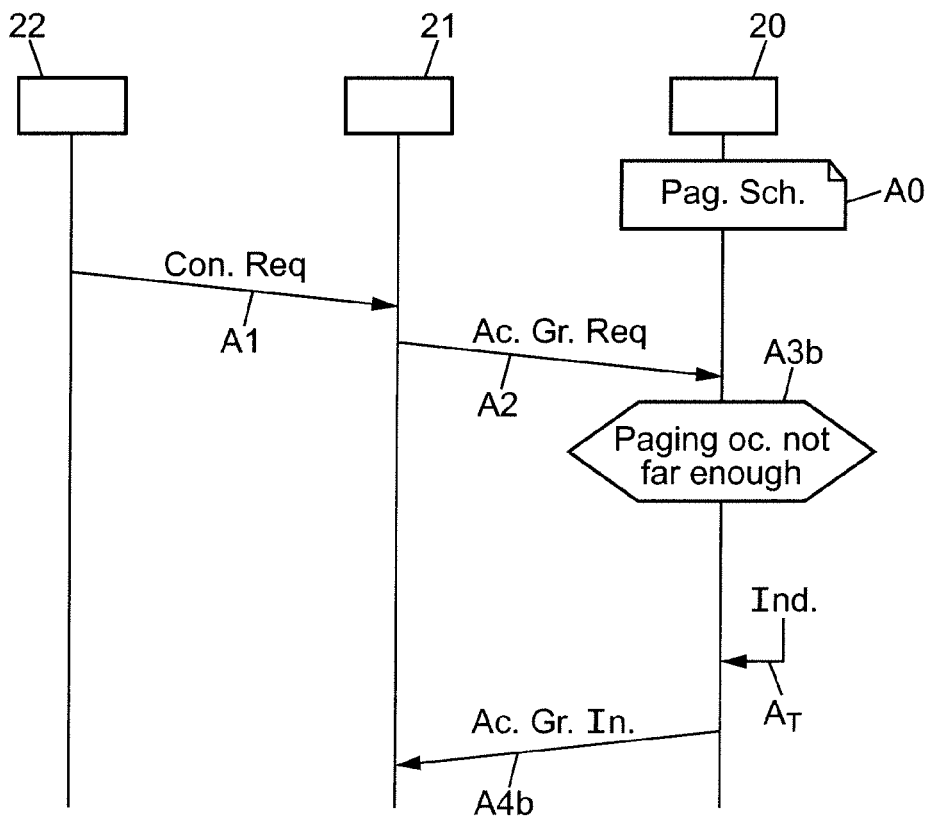

Moreover, modem 10 comprises a delaying module 19 comprising a scheduling block 20 configured to have knowledge of a scheduling of the paging occasions for each SIM associated with the modem 10, as symbolized by area A0 in FIG. 4 and in FIG. 5. Delaying module 19 further comprises a control block 21 configured to control the radio opening time for each SIM, i.e. to monitor a first SIM related cells at some given times and a second SIM related cells at other given times. Delaying module 19 further comprises a request block 22 configured to request a connection for a service.

A request may relate to a foreground activity such as an ongoing voice call, video call, or receipt of a live audio or video stream. A foreground activity is thus an activity which the user is very likely taking active part in. Delaying such a foreground activity would probably be very irritating to the user. Thus, in some embodiments such a request may be considered to be urgent, that is to say to belong to an urgent class of communication.

A request may alternatively relate to a background activity which is likely occurring in the mobile terminal without any active participation by the user. Examples of background activities are email retrieval, synchronization of email, calendar and contacts, checking for news flash information, updating current weather and financial data, and software and security updates. Such an activity may be delayed without much (or even any) impact on performance of the modem. Thus, in some embodiments such a request may be considered to be non-urgent, that is to say to belong to a non-urgent class of communication.

Other definitions of urgent and non-urgent may be practiced within the scope of embodiments of the invention. For example, some foreground activities (e.g. streaming of audio and/or video) may be defined as less urgent than other foreground activities (e.g. telephone calls).

In the example of FIG. 1, a first cell E1 belonging to a first cellular network and a second cell E2 belonging to a second cellular network are in the direct vicinity of the device 1. Modem 10 is capable of listening to the two cellular networks. In other words, modem 10 may receive or emit messages managed by the first cellular network, and receive or emit messages managed by the second cellular network, via respective cells E1 and E2.

In some embodiments, the mobile device 1 has only one baseband module and consequently is obliged to slice its radio opening time between the different SIM. Consequently, as soon as a subscription is active (e.g. for signalling with the network, voice call or packet transfer), the other subscription becomes out of service with respect to the network.

Figure 3:
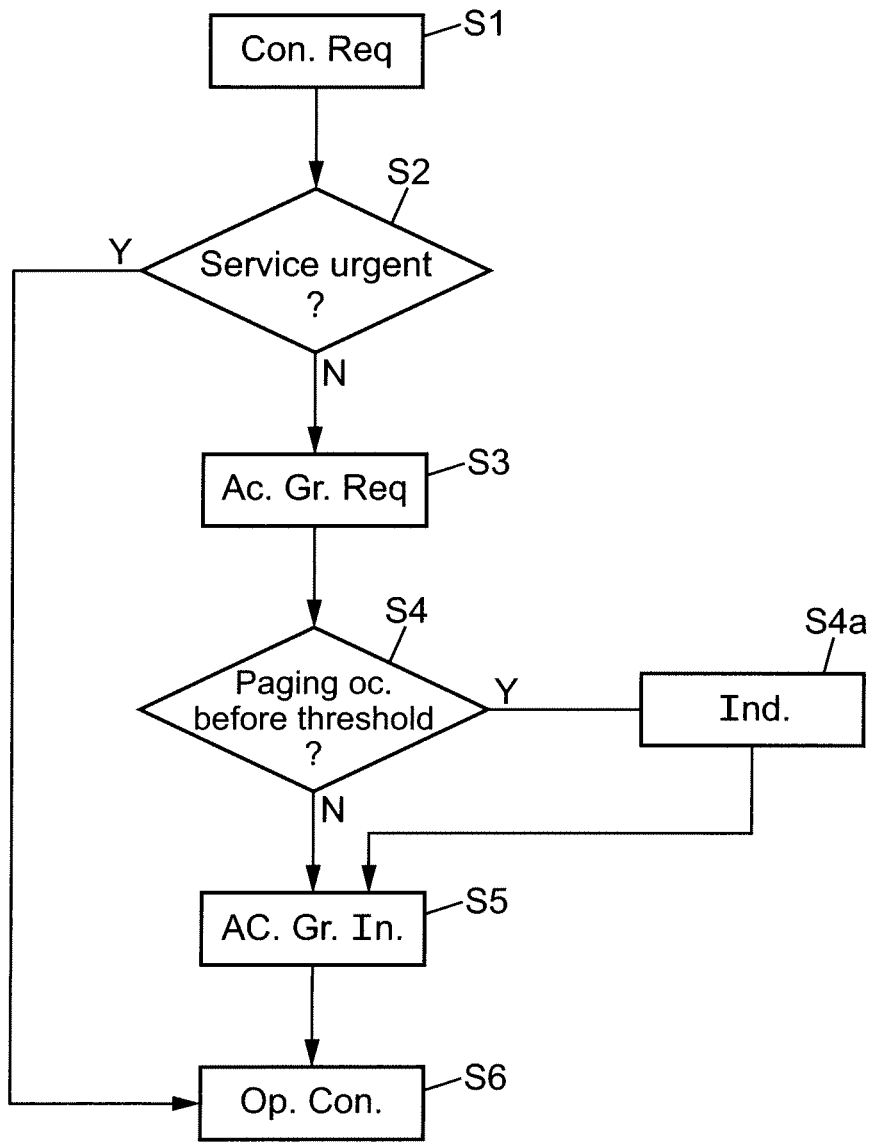
FIG. 3 is a flow chart showing steps of a method for delaying a connection request for a non-urgent service until a paging occasion has been handled, according to an embodiment of the invention.

Referring to FIG. 3 to FIG. 5, we are describing below one embodiment of a method of data processing for delaying a connection request for a non-urgent service in case it is near to a paging occasion on another subscriber identity, until the paging in this paging occasion has been handled. The non-urgent service is for example a packet background activity.

In step S1 of FIG. 3, the request block 22 triggers a connection request to the control block 21, as symbolized by arrow A1 in FIG. 4 and in FIG. 5. This connection request contains an indication related to the type of service, i.e. indicates whether the service belongs to an urgent class of communication or not.

In step S2, the control block 21 tests whether the service associated with the connection request belongs to the urgent class of communication. As explained above, a first class of communication, called non-urgent class, may comprise non-urgent services e.g. background activities (email etc), and a second class of communication, called urgent class, may comprise urgent services e.g. foreground activities (phone calls, streaming, web browsing, etc.). In case the service is determined as non-urgent, the method goes to step S3. In case the service is determined as urgent, the control block 21 does not need to get an access grant from the scheduling block 20 and the method goes directly to step S6.

In step S3, the control block 21 sends an Access Grant Request to the scheduling block 20, as symbolized by arrow A2 in FIG. 4 and in FIG. 5.

In step S4, the scheduling block 20 checks how much time remains until the next paging occasion and tests a condition of whether or not this remaining time is more or less than a delay determination threshold, as symbolized by area A3a in FIG. 4 and area A3b in FIG. 5. The threshold may be pre-determined or adaptive. When the remaining time falls below the threshold, the method goes to step S4a. When the remaining time falls above the threshold, the method goes to step S5.

In step S4a, the scheduling block 20 waits for an indication, from a timer and/or from paging management entities, indicating that the paging occasion has been handled (e.g. a timer has expired, the paging occasion has passed, or a voice call related to the paging occasion is finished), as symbolized by arrow $A_T$ in FIG. 5. If a paging message is to be managed, the establishment of the data session will occur after the voice call is completed. Then the method goes to step S5.

In step S5, the scheduling block 20 transmits an Access Granted Indication to the control block 21, as symbolized by arrow A4a in FIG. 4 and arrow A4b in FIG. 5.

In step S6, the control block 21 controls the opening of the access, i.e. monitor the SIM related to the service.

The cooperation between blocks 20, 21 and 22 permits to grant the requested service depending on a paging occasion, and thus to avoid missed call without reducing the QoS. Packet background connections are generally relatively short connections (and even shorter with increasing data rates) and paging messages are often repeated by the network. The user equipment should thus be able to minimise the page losses and thus the missed calls.

Embodiments of the invention have been described using physical subscriber identity modules (SIM cards) as an example of how a subscriber identity may be defined. However, this must not be the case in alternative embodiments. In such alternative embodiments, one or more of the subscriber identities may be provided to the mobile terminal in the form of a SIM software application executed in the terminal, and/or as a virtual SIM which is "stolen" or "borrowed" from another device and is rendered accessible to the terminal by way of an appropriate interface.

It is further to be noticed that the invention also embraces embodiments with three or more different subscriber identities in a single mobile terminal having less modem functionality (reception/transmission paths) than the number of subscriber identities (e.g. having a single modem (a single receptionpath)).

While there has been illustrated and described example embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

The invention claimed is:

1. Multiple subscriber identity modem capable of receiving messages related to at least two subscriber identities, characterized in that it comprises a delaying module configured to:
   determine, from a connection request for a service associated with a first subscriber identity, whether the service belongs to a first class of communication, and, when the service has been determined as belonging to the first class of communication,
   determine whether a remaining time between the connection request and a next paging occasion, associated with a second subscriber identity, is falling on a first side of a threshold, and, when the remaining time has been determined as falling on the first side of the threshold, and
   delay an access grant indication related to the connection request until the paging occasion has been handled.

2. Multiple subscriber identity modem according to claim 1, wherein the delaying module is further configured to, when the remaining time has been determined as falling on a second side of the threshold, transmit an access grant indication related to the connection request.

3. Multiple subscriber identity modem according to claim 1, wherein the delaying module comprises a request module configured to request a connection for a service, and a control block configured to control a radio opening time for each subscriber identity of the multiple subscriber identity modem, the control block being further configured to receive the connection request for the service and to determine whether the service belongs to the first class of communication.

4. Multiple subscriber identity modem according to claim 1, wherein the delaying module comprises a scheduling block configured to determine information regarding a scheduling of paging occasions for each subscriber identity of the multiple subscriber identity modem, the scheduling block being further configured to determine whether the remaining time between the connection request and the next paging occasion is falling on the first side of the threshold.

5. Multiple subscriber identity modem according to claim 4, wherein the scheduling block is further configured to transmit to the control block an access grant indication to trigger a radio opening time for the first subscriber identity.

6. Multiple subscriber identity modem according to claim 5, wherein the scheduling block is further configured to, when the remaining time between the connection request and the next paging occasion has been determined as falling on the first side of the threshold, wait for the reception of an indication indicating that the paging occasion has been handled before transmitting the access grant indication.

7. Multiple subscriber identity modem according to claim 1, wherein the modem is a Dual SIM Dual Standby modem.

8. Mobile device comprising a multiple subscriber identity modem according to claim 1, and a reception/transmission block for receiving and/or transmitting signals, the reception/transmission block being coupled to the multiple subscriber identity modem.

9. Method of data processing in a multiple subscriber identity modem capable of receiving messages related to at least two subscriber identities, characterized in that it comprises steps of:
 determining, from a connection request for a service associated with a first subscriber identity of the multiple subscriber identity modem, whether the service belongs to a first class of communication, and, when the service has been determined as belonging to the first class of communication,
 determining whether a remaining time between the connection request and a next paging occasion, associated with a second subscriber identity, is falling on a first side of a threshold, and, when the remaining time has been determined as falling on the first side of the threshold, and
 delaying an access grant indication related to the connection request until the paging occasion has been handled.

10. Method according to claim 9, comprising a step of controlling a radio opening time for a subscriber identity of the multiple subscriber identity modem.

11. Method according to claim 9, comprising a step of determining information regarding a scheduling of paging occasions for each subscriber identity of the multiple subscriber identity modem.

12. Method according to claim 9, comprising a step of transmitting an access grant indication to trigger a radio opening time for the first subscriber identity.

13. Method according to claim 12, comprising a step of, when the remaining time between the connection request and the next paging occasion has been determined as falling on the first side of the threshold, waiting for the reception of an indication indicating that the paging occasion has been handled before transmitting the access grant indication.

14. Computer program product comprising a computer readable medium, having thereon one or more stored sequences of instructions being loadable into a processor and adapted to cause, when executed by the processor, execution of the steps of claim 9.

* * * * *